United States Patent [19]

Maher

[11] 4,219,866
[45] Aug. 26, 1980

[54] CERAMIC CAPACITOR HAVING A DIELECTRIC OF (Pb,La)(Zr,Ti)O₃ AND BATIO₃

[75] Inventor: Galeb H. Maher, North Adams, Mass.

[73] Assignee: Sprague Electric Company, North Adams, Mass.

[21] Appl. No.: 2,837

[22] Filed: Jan. 12, 1979

Related U.S. Application Data

[63] Continuation-in-part of Ser. No. 802,160, May 31, 1977, Pat. No. 4,135,224, which is a continuation-in-part of Ser. No. 619,089, Oct. 2, 1975, Pat. No. 4,027,209.

[51] Int. Cl.² ............................................. H01G 4/12
[52] U.S. Cl. ................................. 361/321; 106/39.8; 252/63.2; 361/322
[58] Field of Search ............... 361/321, 322; 106/39.8; 252/63.2, 63.5

[56] References Cited

U.S. PATENT DOCUMENTS

| | | | |
|---|---|---|---|
| 2,541,833 | 2/1951 | Roberts | 252/63.5 X |
| 3,440,067 | 4/1969 | Fujiwara | 361/321 X |
| 3,732,117 | 5/1973 | Nitta | 252/63.5 X |
| 4,027,209 | 5/1977 | Maher | 361/321 |

FOREIGN PATENT DOCUMENTS 2093279  1/1972  France ..................................... 361/321

50-83407  11/1973  Japan ..................................... 252/63.5
51-42760  11/1976  Japan ..................................... 252/63.5

OTHER PUBLICATIONS

G. Haertling, Hot Pressed (Pb,La)Zr,Ti)O₃ Ferroelectric Ceramics for Electrooptic Applications, J. Amer. Ceramics Soc., v. 54, #1, Jan. 71, pp. 1–11.

T. Ikeda, Studies of (Ba–Pb)(Ti–Zr)O₃ System, J. Physical Society of Japan, vol. II, #2, Feb. 1969, pp. 168–174.

Shepard Roberts, Dielectric Properties of Lead Zirconate and Barium–Lead Zirconate, J. of Am. Ceramic Soc., vol. 33, #2, 1950, pp. 63–66.

*Primary Examiner*—Richard R. Kucia
*Attorney, Agent, or Firm*—Connolly and Hutz

[57] ABSTRACT

A ceramic capacitor has a dielectric body including a ceramic and a low melting flux. The ceramic consists of a major proportion of an antiferroelectric lead lanthanum zirconate titanate and a minor proportion of a barium titanate. The body may also include up to 10 weight percent of a low melting flux, which is especially useful in monolithic ceramic capacitors having buried silver-containing electrodes. These dielectric bodies exhibit at moderate voltage stress levels an improved combination of properties including a high dielectric constant that is relatively stable with changing voltage and temperature.

6 Claims, 4 Drawing Figures

CERAMIC CAPACITOR HAVING A DIELECTRIC OF (Pb,La) (Zr,Ti)O₃ AND BATIO₃

CROSS REFERENCE

This application is a continuation-in-part of Ser. No. 802,160, 5-31-77 now U.S. Pat. No. 4,135,224 issued Jan. 16, 1979, which is a continuation-in-part of Ser. No. 619,089, 10-2-75, now U.S. Pat. No. 4,027,209 issued May 31, 1977.

BACKGROUND OF THE INVENTION

This invention relates to a ceramic capacitor having a dielectric body containing a major proportion of a lead lanthanum zirconate titanate and a minor proportion of barium titanate.

Lead lanthanum zirconate titanate (PLZT) formulations having a strong antiferroelectric characteristic variously doped with silver and bismuth are shown to be exceptionally useful capacitor dielectric materials in my U.S. Pat. No. 4,027,209 issued May 31, 1977, and in my patent application Ser. No. 802,160 filed May 31, 1977, both being assigned to the same assignee as is the present invention. These materials have a high dielectric constant (K) that is relatively stable as a function of temperature and of the magnitude of voltage stress. Many if not most capacitors today are employed in circuits wherein the capacitor is stressed to about 100 volts or less. Monolithic ceramic capacitors normally employ dielectric ceramic layers of about 1 mil (0.001 inch or 0.0025 cm) thick so that 100 volts applied to the capacitor causes about 100 volts/mil stress in the dielectric. The above noted silver doped PLZT materials are generally more stable at 100 volts/mil than required for most uses.

It is therefore an object of the present invention to provide a capacitor having a temperature stable PLZT dielectric exhibiting antiferroelectric properties and an enhanced dielectric constant.

It is a further object of this invention to provide a ceramic capacitor, wherein the ceramic has a high dielectric constant at from 0 to about 100 volts/mil stress.

SUMMARY OF THE INVENTION

At least 90 weight percent of the dielectric body of a ceramic capacitor consists of a ceramic containing a lead zirconate and a barium titanate wherein from 0.07 to 0.16 molar parts of the lead are replaced by lanthanum and from 0.10 to 0.40 molar parts of the zirconate are replaced by titanate such that the atomic ratio of barium to lead is from 0.015 to 0.39. The ceramic is doped with from 0.1 to 1.5 weight percent silver.

The silver dopant produces a relatively stable dielectric constant as a function of operating temperature. The barium titanate additive combines with the lead lanthanum zirconate titanate (PLZT) to increase the dielectric constant at the expense of stability in dielectric constant at high voltage stress levels and has a surprisingly small effect on the temperature stable characteristics of the basic silver doped PLZT. At up to 100 volts per mil stress, dielectric materials of this invention exhibit a combination of high dielectric constant and high stability with voltage stress and operating temperature that is superior to prior art capacitors.

Capacitors of this invention are made by forming a powder mixture of barium titanate with a powder blend of PLZT precursor compounds so that the molar ratio of barium to lead is from 0.015 to 0.39. A body is formed of this mixture, is subsequently fired to maturity and is doped with up to 1.5 weight percent silver. Two spaced electrodes may be later deposited on outer surfaces of the mature body or alternatively a monolithic ceramic capacitor is formed by interleaving films of an electroding paste between layers of the above noted powder mixture prior to firing. When the electroding paste contains silver, the silver doping will be at least partially accomplished at firing. On the other hand all the silver dopant may be added to the powder mixture e.g. as the metal or as silver oxide. The precursor compounds may alternately consist of a calcined PLZT or of various mixtures of simple zirconates, titanates, oxides and combinations thereof. In the latter instances the addition of a low melting flux to the mixture prior to firing will advantageously permit firing at 1150° C. or less to aid sintering and the formation of a barium lead lanthanum zirconate titanate ceramic phase. Also, the use of a low melting flux in the dielectric body of monolithic ceramic capacitors is preferred to permit the use of low melting silver containing electrodes which have a relatively low cost and may at the same time represent the only source of the doping silver.

DESCRIPTION OF THE PREFERRED EMBODIMENTS

Figure 1:
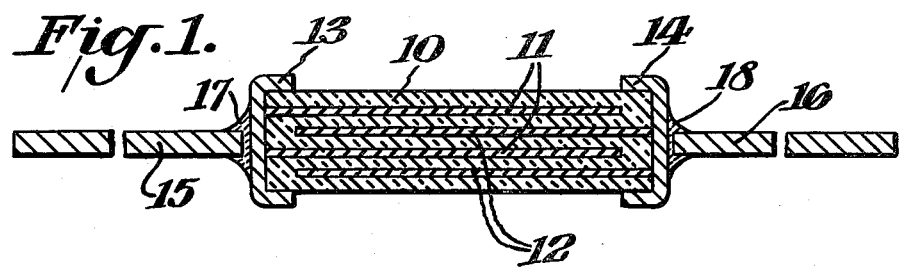
FIG. 1 shows in side sectional view a monolithic ceramic capacitor of this invention.

The monolithic ceramic capacitor of FIG. 1 has a ceramic body 10 and film electrodes 11 interleaved with film electrodes 12 being buried in the body 10. Conductive termination coatings 13 and 14 contact electrodes 11 and 12, respectively. Lead wires 15 and 16 are attached by solder bonds 17 and 18 to terminations 13 and 14, respectively. Although the capacitor of FIG. 1 has three active ceramic dielectric layers, between adjacent and oppositely polarized electrodes, experimental monolithic capacitors to be described herein, have more active dielectric layers.

Figure 2:
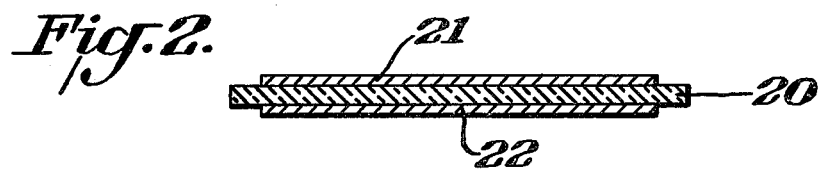
FIG. 2 shows in side sectional view a ceramic chip capacitor of this invention.

The chip capacitor of FIG. 2 has a ceramic body 20 and two film electrodes 21 and 22 on the opposite major surfaces of the body 20, respectively. Experimental chip capacitors have a rectangular shape but may more generally be circular, and for high voltage uses may have a thickness equaling or exceeding the largest dimension of a major surface.

A brief description of the steps employed for making the experimental capacitors is as follows:

A powder mixture of lead lanthanum zirconate titanate and barium titanate, and in some cases a low-melting flux such as glass, was stirred with an organic binder medium of essentially turpentine, 6% pine oil and 5% lecithin to produce a dispersion or slurry containing about 70% by weight of solids, namely the ceramic and low melting flux. This slurry was ball milled for about 10 hours.

Monolithic capacitors were produced by applying successive coatings of the above noted milled slurry to a substrate, drying each layer in turn and screen printing an electroding paste of 70% silver and 30% palladium particles onto each except the last of the dired layers of the dielectric material.

This assembly of dried layers with interleaved films of electroding paste was then diced into a multiplicity of square bodies. The electrodes were so arranged that after dicing, each body had the alternate of the electrodes extending to one cut end of the body and the other electrodes extend to the opposite cut end of the body as illustrated in FIG. 1. The body was subsequently fired to maturity in a closed alumina crucible at a peak temperature, $T_f$, between 1100° C. and 1250° C. for 2½ hours. A silver paste was applied to the opposite ends of the fired body and the body was heated to about 1400° F. for 5 minutes to form cured terminals, e.g. 13 and 14. A lead wire was then soldered to each of the two silvered terminals.

Chip capacitors as illustrated in FIG. 2 were made by casting the above noted slurry on a glass plate to a thickness of about 0.020 inch (0.051 cm), drying the cast layer, removing the dried layer and cutting it into square pieces (e.g. 20) each having an area of 0.25 in² (1.6 cm²). The binder was removed by baking at 700° C. and the chips were then sintered in a closed crucible at a peak firing temperature, $T_f$, for 2½ hours. A silver paste was applied over the two opposite major surfaces of the mature chips and the chips were heated to 1450° F. for ½ hour to cure the terminals (e.g. 21 and 22 in FIG. 2).

For making the above mentioned (Pb,La) (Zr,Ti)O₃ ceramic, unless otherwise noted, the oxides of Pb, Zr and Ti and lanthanum carbonate were weighed out in the desired molar proportions according to the molar formula below to yield about a 30 pounds mixture.

$$Pb_{1-x}La_x(Zr_yTi_{1-y})_{1-x/4}O_3$$

The molar ratios of Pb/La and of Zr/Ti employed in these ceramic compositions are given in Table I. The mixture was ball milled in deionized water, oven dried at 250° C., granulated and then calcined at 1650° F. in an alumina sagger soaking for 6 hours at this temperature. This material was then recalcined for 1½ hours at 2100° to 2250° F. in a closed crucible. This blend was crushed and jet pulverized to an average particle size of about 1.2 microns, as determined by a standard Fisher Subsieve analyzer. The above formula is more accurately a recipe having been taught to be lead rich and having been preferred for preparing the starting materials by those who have employed such ceramics in electrooptical transducer devices.

The formulations of three experimental antiferroelectric ceramic compositions are shown in Table I.

Table I

| | Ceramic Compositions (in mole percent) | | |
|---|---|---|---|
| | A1 | A2 | A3 |
| Pb/La | 88/12 | 87.1/12.9 | 91/9 |
| Zr/Ti | 70/30 | 66.4/33.6 | 80/20 |

For making the low melting flux or glass, approximately 600 grams of the constituent oxides, listed in Table II below for each of four flux compositions, were mixed and were melted in a platinum crucible between 1200° F. and 1600° F. for one hour and then water quenched. The resulting material was then jet pulverized to about 1 to 3 microns average particle diameter.

Table II

| | Flux Compositions (in weight percent) | | | |
|---|---|---|---|---|
| | B1 | B2 | B3 | B4 |
| $B_2O_3$ | 5.0 | 0 | 13.1 | 0 |
| $SiO_2$ | 5.0 | 9.3 | 12.3 | 0 |
| $Al_2O_3$ | 1.0 | 0 | 0 | 0 |
| ZnO | 5.0 | 0 | 10.0 | 0 |
| CdO | 36.0 | 0 | 0 | 0 |
| $Bi_2O_3$ | 23.0 | 90.7 | 0 | 100 |
| PbO | 25.0 | 0 | 64.6 | 0 |

The dielectric compositions of a number of experimental capacitors are listed in Table III along with the peak firing temperatures, $T_f$, employed in each case. Except in Example 24, the firing temperature was just high enough to obtain substantially full densification. The monolithic capacitors (Examples 12, 13, 14, 15 and 24) employed 70Ag30Pd buried electrodes while the chip capacitors (all other examples) have none. Some of the silver from the buried electrodes was reacted with and doped the ceramic of the monolithic capacitors at firing, having the effect of flattening the curve of capacitance as a function of the operating temperature, as is first disclosed in my patent U.S. Pat. No. 4,027,209 issued May 31, 1977. Niobium atoms (Nb) are substituted for titanium atoms in the barium titanate by the indicated molar amounts: a=0.047 and b=0.04. Similarly, the additives (La) and (Ce) are substituted for some of the barium in the barium titanate in the molar amount: c=0.075.

TABLE III

| Example | DIELECTRIC (% by weight) | | | | Buried Electrode | $T_f$ (°C.) |
|---|---|---|---|---|---|---|
| | PLZT | $BaTiO_3$ | Additive | Flux | | |
| 1 | 97.0A₁ | 0 | 1Ag | 2.0B₁ | | 1100 |
| 2 | 92.2A₁ | 3.8 | 1Ag(Nb)ₐ | 3.0B₁ | | 1100 |
| 3 | 89.3A₁ | 6.7 | 1Ag(Nb)ₐ | 3.0B₁ | | 1100 |
| 4 | 86.4A₁ | 9.6 | (Nb)ₐ | 4.0B₁ | | 1100 |
| 5 | 76.8A₁ | 19.2 | (Nb)ₐ | 4.0B₁ | | 1100 |
| 6 | 72.0A₁ | 24.0 | (Nb)ₐ | 4.0B₁ | | 1100 |
| 7 | 81.6A₁ | 14.4 | 0 | 4.0B₁ | | 1100 |
| 8 | 81.6A₁ | 14.4 | (Nb)ᵦ | 4.0B₁ | | 1100 |
| 9 | 81.6A₁ | 14.4 | (La)꜀ | 4.0B₁ | | 1100 |
| 10 | 81.6A₁ | 14.4 | (Ce)꜀ | 4.0B₁ | | 1100 |
| 11a | 81.4A₁ | 14.4 | ¼Ag(Nb)ₐ | 4.0B₁ | | 1100 |
| 11b | 81.2A₁ | 14.3 | ½Ag(Nb)ₐ | 4.0B₁ | | 1100 |
| 12 | 86.4A₁ | 9.6 | (Nb)ₐ | 4.0B₁ | 70Ag30Pd | 1100 |
| 13 | 90.2A₂ | 6.8 | (Nb)ₐ | 3.0B₁ | 70Ag30Pd | 1100 |
| 14 | 98.0A₂ | 0 | 0 | 2.0B₁ | 70Ag30Pd | 1100 |
| 15 | 99.0A₂ | 0 | 0 | 1.0B₄ | 70Ag30Pd | 1150 |
| 16 | 85.5A₁ | 9.5 | 1Ag(Nb)ₐ | 4.0B₂ | | 1100 |
| 17 | 89.1A₁ | 9.9 | (Nb)ₐ | 1.0B₄ | | 1150 |
| 18 | 85.5A₁ | 9.5 | 1Ag(Nb)ₐ | 4.0B₃ | | 1150 |
| 19 | 89.1A₁ | 9.9 | 1Ag(Nb)ₐ | 0 | | 1250 |
| 20 | 100.0A₃ | 0 | 0 | 0 | | 1250 |
| 21 | 80.8A₃ | 14.2 | 1Ag(Nb)ₐ | 4.0B₁ | | 1100 |
| 22 | 71.2A₁ | 14.3 | 1Ag(Nb)ₐ 9.5PbTiO₃ | 4.0B₁ | | 1100 |
| 23 | 71.2A₁ | 14.3 | 1Ag(Nb)ₐ 9.5PbZrO₃ | 4.0B₁ | | 1100 |
| 24 | 85.5A₁ | 9.5 | (Nb)ₐ | 5.0B₁ | 70Ag30Pd | 1100 |

The electrical performance of these experimental capacitors is shown in Table IV.

TABLE IV

| Example | K @ 25° C. | DF (%) | TCC (% ΔC ref. 25° C.) -55° | -30 | +85 | +125° C. | VCC (% ΔC ref. 0 volts) 20 | 50 | 100 v./mil | $K_{V100}$ |
|---|---|---|---|---|---|---|---|---|---|---|
| 1 | 1200 | 0.25 | -12.4 | -0.8 | +9.0 | +5.8 | +5.0 | +12.0 | +8.0 | 1296 |
| 2 | 1450 | 0.35 | -17.5 | +1.5 | +3.7 | -1.5 | | | | |
| 3 | 1500 | 0.35 | -9.4 | +1.7 | +0.8 | -7.5 | | | | |
| 4 | 2000 | 1.0 | -27.0 | -12.0 | -7.5 | -19.4 | +0.2 | -6.0 | -18.0 | 1640 |
| 5 | 2100 | 0.85 | -10.5 | -1.5 | -10.1 | -21.0 | +3.1 | -5.0 | -16.3 | 1758 |
| 6 | 1250 | 0.55 | -2.8 | +0.7 | -10.1 | -21.0 | | | | |
| 7 | 2450 | 1.0 | -23.3 | -6.8 | -11.3 | -25.0 | | | | |
| 8 | 2580 | 1.0 | -21.4 | -6.0 | -12.0 | -25.5 | | | | |
| 9 | 2050 | 0.85 | -13.5 | +0.7 | -12.1 | -25.5 | | | | |
| 10 | 2360 | 1.3 | -25.0 | -9.0 | -10.5 | -24.3 | | | | |
| 11a | 1900 | 0.5 | -15.8 | -2.2 | -6.8 | -19.9 | | | | |
| 11b | 1800 | 0.35 | -12.4 | -0.7 | -5.3 | -16.3 | | | | |
| 12 | 1700 | 0.5 | -6.8 | +3.0 | -2.2 | -12.8 | +3.4 | +2.0 | -13.0 | 1479 |
| 13 | 1670 | 0.35 | -13.0 | -0.8 | +0.4 | -8.0 | +4.0 | +2.7 | -9.9 | 1505 |
| 14 | 1270 | 0.3 | -9.0 | -0.5 | +8.0 | +4.0 | +3.1 | +7.6 | +3.5 | 1315 |
| 15 | 1300 | 0.2 | -1.0 | +5.0 | +7.0 | +0.5 | +4.0 | +8.4 | +7.5 | 1398 |
| 16 | 1770 | 0.25 | +0.7 | +3.0 | +2.1 | -15.7 | | | -6.0 | 1663 |
| 17 | | | -7.5 | +6.5 | -6.8 | -27.4 | | | | |
| 18 | 1900 | 0.2 | +2.4 | +6.5 | -7.4 | -22.0 | | | -6.5 | 1777 |
| 19 | 2220 | 0.2 | +3.0 | +8.8 | -10.9 | -27.0 | | | -18.6 | 1807 |
| 20 | 1630 | 1.25 | -35.0 | -22.5 | +9.2 | +2.7 | | | | |
| 21 | 1700 | 0.4 | -12.0 | 0.0 | -4.7 | -16.5 | | | -21.0 | 1343 |
| 22 | 2220 | 1.2 | -58 | -30 | +7 | -14 | | | -31.0 | 1532 |
| 23 | 1530 | 0.45 | -21 | -2.0 | -13 | -27 | | | | |
| 24 | 2000 | 0.4 | -25 | -4.0 | -3.2 | -18 | | | -17.7 | 1646 |

Figure 3:
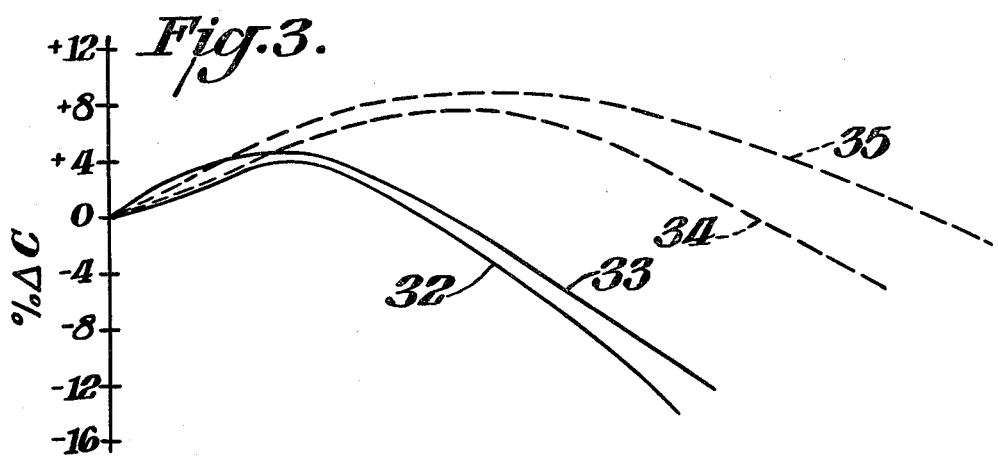
FIG. 3 is a graph showing the change in capacitance as a function of dielectric voltage-stress for capacitors of this invention compared to those of the piror art.
Figure 4:
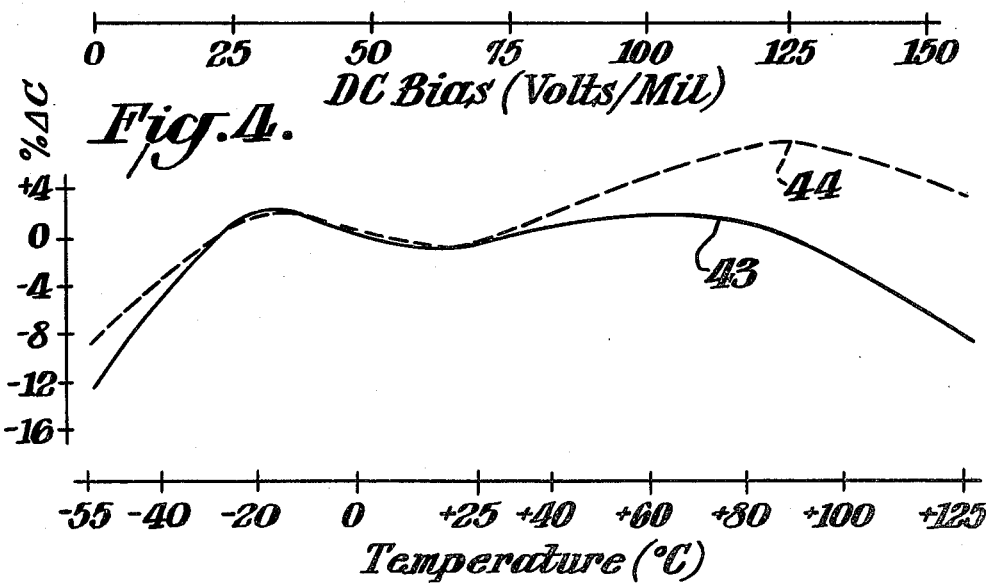
FIG. 4 is a graph showing the change in capacitance as a function of operating temperature for a capacitor of this invention compared to one of the prior art.

The capacitors of examples 1, 3, 12, 13, 14, 15 and 16 all have silver doped dielectrics, and exhibit a temperature coefficient of capacitance (TCC) that is within the industry standard X7R characteristic calling for a maximum change in capacitance over −55° C. to 125° C. of 15%. Of this group of experimental capacitors, those containing minor additions of barium titanate, i.e. examples 12, 13 and 16, have higher values of dielectric constant, K, and their voltage coefficient of capacitance (VCC) remains strongly antiferroelectric. The VCC data for Examples 12, 13, 14 and 15 is shown in FIG. 3 as curves 32, 33, 34 and 35, respectively. The TCC data for Examples 13 and 14 is shown in FIG. 4 as curves 43 and 44, respectively, the double humped TCC curves are reminiscent of conventional ceramic materials containing two distinct ceramic phases. However, x-ray and micro-probe analyses of the grains in these examples indicates that they consist predominantly of only one ceramic phase.

The last column in Table IV shows for a number of the experimental capacitors the value of the measured dielectric constant $K_{V100}$ when the dielectric is stressed at 100 volts per mil. The experimental capacitors of this invention for which this data was taken Examples 4, 5, 12, 13, 16, 18, 19, 21, 22 and 24 exhibit a greater $K_{V100}$ than do the PLZT formulations of Examples 1, 14 and 15 which have no barium titanate additive with the exception of Example 22. The $K_{V100}$ of Examples 22 and 15 are practically equal, within experimental accuracy.

A great many monolithic ceramic capacitors of current manufacture, exhibiting a K of greater than 1000 and performing within the X7R standard for capacitance versus temperature, use dielectric ceramics that are predominantly barium titanate, a ferroelectric ceramic. One such commercial material is by weight 89% of a ceramic and 11% glass, which is essentially the same glass as that designated B-1 herein. The ceramic component is by weight 95 $BaTiO_3$, 3.8 $CaZrO_3$ and 1.2 $Nb_2O_3$. This commercial material has a K of 1450, meets the X7R standard, and the $K_{V100}$ is 1000. The antiferroelectric ceramic of Example 12 herein has a greater dielectric constant at all temperatures and at voltage stresses up to and over 100 volts per mil.

Varying amounts of barium titanate are added to a PLZT ceramic in examples 1 through 6. It is seen from the data in Table IV that at more than about 20 weight percent barium titanate, the dielectric constant begins to decrease rapidly and the beneficial range of additive amounts does not extend above 20 weight percent. The lead is greatest in the PLZT materials of this invention when in the above mentioned formula, x=0.16, and after fully reacting this material with the maximum 20 weight percent barium titanate, the corresponding maximum atomic ratio in the fired ceramic phase of Ba/Pb is about 0.39. Thus a Ba/Pb ratio of less than 0.40 is preferred. For 1.0 weight percent $BaTiO_3$ the ratio of Ba/Pb is about 0.015 and at least this amount is considered necessary to provide a significant improvement in electrical properties.

Examples 7 through 10 are provided to show the effect of additives which may be desired for adjusting properties of the dielectric material such as the shape of the TCC curve, the leakage resistance and the dissipation factor (DF). Lanthanum (Ex. 9) improves the TCC at −55° C. but reduces the K. Cerium (Ex. 10) changes the TCC very little but increases the aging rate. Niobium (Ex. 8) reduces the aging rate to a very low-0.7% per decade, has a small tendency to increase K and to flatten the TCC curve, and is thus a preferred additive.

Examples 11a and 11b along with examples 7 and 21, show the effect of increasing amounts of silver in the ceramic. Even the smallest amount (0.25 wt%) of Example 11a dramtically flattens the TCC. Increasing amounts decrease the K and have a progressively smaller beneficial effect on the TCC. It is thus preferred to incorporate no more than about 1.5 weight percent silver in the dielectric materials of this invention.

Examples 15 through 18 employ low melting flux components other than the B-1 glass used in the other examples. Also, Examples 13 through 21 show the effect of varying the PLZT composition within the range of Pb/La from 0.94/0.06 to 0.83/0.17 and Zr/Ti from 0.90/0.10 to 0.60/0.40 having been described as exhibiting antiferroelectric behavior in the aforementioned patent and patent application.

Example 19 shows the same beneficial results when barium titanate is added to a PLZT without any low melting flux. Such materials must be fired at a higher temperature to obtain densification and realization of optimum electrical properties, and though not suitable for monolithic capacitors with low melting silver containing electrodes, may be excellent for chip and high voltage slug capacitors.

In Examples 22 and 23 a calcined PLZT powder of Type A-1 is mixed with barium titanate, silver and a stoichiometric lead compound, $PbTiO_3$ and $PbZrO_3$, respectively. At firing, a substantially single phase ceramic is formed containing these components, effectively modifying the ratios Pb/La and Zr/Ti in the ceramic, to 0.886/0.114 and 0.686/0.314 respectively, in Example 22 and to 0.889/0.111 and 0.710/0.290 respectively, in Example 23.

Example 24 demonstrates a method for forming a PLZT+$BaTiO_3$+flux dielectric wherein the PLZT component is not precalcined as in the other examples. The start materials and their amount in weight percent for making this material are shown in Table V. Calculated molar amounts in the resulting PLZT are shown in parentheses indicating that the PLZT has the formula designated herein as A-1.

Table V

| Weight amounts | (Molar amts. of PLZT element) |
|---|---|
| 63.54 $PbZrO_3$ | (.70 $PbZrO_3$) |
| 14.32 $PbTiO_3$ | (.18 $PbTiO_3$) |
| 7.64 $La_2Ti_2O_7$ | (.12 $LaTiO_{3.5}$) |
| 9.5 $BaTiO_3$* | |
| 5.0 B-1 glass | |

*with $(Nb)_a$

These monolithic capacitors of Example 24 each have twelve 1 mil thick active dielectric layers (13 film electrodes). By electron microprobe analysis it was determined that the ceramic grains have acquired 0.97 weight percent silver from the electrodes. The chip capacitors of Example 19 have essentially the same dielectric composition as those of Example 24 but have a flatter TCC, higher K and a flatter VCC characteristic. The greater amount of flux in Example 24 was still less than enough to obtain full densification at 1100° C., but nevertheless the electrical properties are useful and superior to prior art materials for many purposes. It is judged that an addition of about 1 weight percent $Bi_2O_3$ will result in full densification and further improve the electrical characteristics.

The method of the present invention also anticipates employing as ceramic start materials a precalcined lead zirconate titanate, e.g. $Pb(ZrO_3)_{0.55}(TiO_3)_{0.45}$, plus a barium lanthanum zirconate, e.g. $Ba_{0.5}La_{0.5}ZrO_3$, or plus $BaZrO_3$ and $La_2Zr_2O_7$.

In three other experiments, not represented in Tables IV and V, there was added to a PLZT formulation as in Example 20, about ¼ weight percent silver and 0, 1, and 3 weight percent sodium. The effects on the TCC were the same as though additional silver had been added but increasing amounts of sodium tended to increase the sintering temperature and reduce the dielectric constant at a faster rate per mole of the sodium additive than for silver. However, in small quantities up to 50 mol percent, the substitution of sodium for silver in a ceramic of this invention will provide excellent properties at a lower cost.

As was pointed out in the aforenoted patent, increasing the glass content in the start materials results in a lower dielectric constant and a smoother TCC. Thus for example, adding more glass in the formulation of Example 5 would tend to produce capacitors with performance similar to those of Example 13. It is considered that in general, up to 10 weight percent flux may be used in a ceramic dielectric of this invention. However, for those intended to meet the X7R standard no more than 5 weight percent flux is preferred.

This invention also envisions the partial minor substitution of tin or hafnium for the zirconium, and of tantalum for the niobium. Praeseodymium, a rare earth of the lanthanide series, has the same charge and about the same ionic radius as lanthanum, and may be substituted in minor molar amounts for the lanthanum of the PLZT ceramic of this invention.

In all of the examples in which a sintering flux was employed, it is believed that some of the larger cations in the starting flux, e.g. bismuth, cadmium and lead, react with and become incorporated in the ceramic portion of the dielectric at firing. Thus the antiferroelectric materials of this invention may include small amounts of such cations in the ceramic grains.

What is claimed is:

1. A ceramic capacitor comprising a dielectric body and two spaced electrodes in contact with said body, at least 90 weight percent of said body consisting of a ceramic composed of a lead zirconate and a barium titanate wherein from 0.07 to 0.16 molar parts of said lead are replaced by lanthanum, wherein from 0.10 to 0.40 molar parts of said zirconate are replaced by titanate, and wherein the atomic ratio of barium to lead is from 0.015 to 0.39, said ceramic being doped with from 0.1 to 1.5 weight percent silver.

2. The capacitor of claim 1 wherein up to 50 atomic percent of silver is replaced by sodium.

3. The capacitor of claim 1 wherein said ceramic is additionally doped with niobium.

4. The capacitor of claim 1 wherein said body is additionally comprised of up to 10 weight percent of a low melting temperature flux.

5. The capacitor of claim 4 wherein said low-melting temperature flux is comprised of at least 20 weight percent of a glass former oxide selected from boria, silica and combinations thereof.

6. The capacitor of claim 4 wherein said flux includes at least 40 weight percent of low-melting-metal oxides selected from cadmium, bismuth, lead and combinations thereof.

* * * * *